United States Patent [19]

Tsutsui et al.

[11] Patent Number: 5,519,091
[45] Date of Patent: May 21, 1996

[54] METHOD FOR THE PREPARATION OF ETHYLENE POLYMER COMPOSITIONS

[75] Inventors: Toshiyuki Tsutsui; Takashi Ueda, both of Kuga, Japan

[73] Assignee: Mitsui Petrochemical Industries, Ltd., Tokyo, Japan

[21] Appl. No.: 455,109

[22] Filed: May 31, 1995

Related U.S. Application Data

[62] Division of Ser. No. 140,895, Oct. 25, 1993, which is a continuation of Ser. No. 654,031, Feb. 12, 1991, abandoned.

[30] Foreign Application Priority Data

Feb. 13, 1990 [JP] Japan .................................. 2-32092
Feb. 13, 1990 [JP] Japan .................................. 2-32093

[51] Int. Cl.$^6$ ............................ C08L 23/08; C08L 23/20
[52] U.S. Cl. ........................ 525/240; 525/320; 525/324; 526/348
[58] Field of Search ............................................. 525/240

[56] References Cited

U.S. PATENT DOCUMENTS

| | | | |
|---|---|---|---|
| 4,438,238 | 3/1984 | Fukushima et al. | 525/240 |
| 4,701,432 | 6/1986 | Welborn | 502/113 |
| 4,935,474 | 6/1990 | Ewen et al. | 526/119 |
| 4,937,299 | 6/1990 | Ewen et al. | 525/240 |
| 4,939,217 | 7/1990 | Stucklen | 526/114 |
| 5,104,838 | 4/1992 | Fujita et al. | 502/108 |
| 5,122,491 | 6/1992 | Kioka | 502/117 |
| 5,382,630 | 1/1995 | Stehling et al. | 525/240 |
| 5,382,640 | 1/1995 | Stehling et al. | 525/240 |

FOREIGN PATENT DOCUMENTS

| 0022376 | 1/1981 | European Pat. Off. |
| 9003414 | 4/1990 | WIPO |

*Primary Examiner*—Carman J. Seccuro, Jr.
*Attorney, Agent, or Firm*—Sherman and Shalloway

[57] ABSTRACT

In accordance with the present invention, there is provided a method for the preparation of an ethylene polymer composition having a density of 0.86–0.94 g/cm$^3$ and an intrinsic viscosity [η] of 1–6 dl/g using an olefin polymerization catalyst composed of a transition metal compound containing a ligand having a cycloalkadienyl skeleton and an organoaluminium oxy-compound, and there is also provided a method for the preparation of an ethylene polymer composition having density of 0.87–0.93 g/cm3 and an intrinsic viscosity [η] of 0.5–6 dl/g.

4 Claims, 6 Drawing Sheets

* nujol absorption peak

# 5,519,091

METHOD FOR THE PREPARATION OF ETHYLENE POLYMER COMPOSITIONS

This is a division of application Ser. No. 08/140,895 filed Oct. 25, 1993, abandoned, which is a continuation of Ser. No. 07/654,031 filed Feb. 12, 1991, now abandoned.

FIELD OF THE INVENTION

This invention relates to a method for the preparation of ethylene polymer compositions, particularly to a method for the preparation of ethylene polymer compositions by multistage polymerization, and more particularly to a method for the preparation of ethylene polymer compositions which are excellent in melt properties and favorable in processability at the time of melt molding.

The invention also relates to a method for the preparation of ethylene polymer compositions which are small in amount of their hydrocarbon solvent-soluble portion in spite of their having a low density and accordingly excellent in anti-block properties and also heat resistance.

BACKGROUND OF THE INVENTION

Recently, methods for the preparation of olefin polymers using a catalyst composed of a zirconocene compound and aluminoxane as a new type of Ziegler olefin polymerization catalysts have been proposed, for example, in Japanese Patent L-O-P Publns. Nos. 19309/1983, 35007/1985 and 221208/1986. According to these publications cited above, it is reported that ethylene polymers having a narrow molecular weight distribution and a narrow composition distribution and excellent in transparency are obtained. However, the polymers obtained by the use of such olefin polymerization catalysts as mentioned above have a narrow molecular weight distribution and are poor in processability on molding equipment, hence it is desired that the polymers shall be improved in melt properties according to the purpose for which they are used.

With the view of improving the above-mentioned methods, Japanese Patent L-O-P Publns. Nos. 35006/1985 and 35008/1985 propose a combination use of two or more kinds of metallocene compounds as the olefin polymerization catalysts, and Japanese Patent L-O-P Publns. No. 501369/1988 proposes a combination use of a metallocene compound and non-metallocene compound as the olefin polymerization catalysts. However, none of these proposals are found yet to be wholly satisfactory.

Furthermore, the polymers, particularly copolymers obtained by the use of the above-mentioned olefin polymerization catalysts are low in melting point and poor in heat resistance, hence it is desired said polymers or copolymers shall be improved in heat resistance.

On the one hand, ethylene copolymers obtained by the use of titanium based catalysts composed of a titanium compound and an organoaluminum compound are excellent in heat resistance, but have such drawback that when they are prepared so as to have a low density, the amount of their hydrocarbon solvent-soluble portion becomes large and they exhibit poor anti-block properties.

OBJECT OF THE INVENTION

The present invention has been made in view of the prior art mentioned above, and an object of the invention is to provide a method for the preparation of ethylene polymer compositions which are excellent in melt properties while retaining excellent characteristics of their own.

A further object of the invention is to provide a method for the preparation of ethylene polymer compositions which are excellent in anti-block properties and heat resistance while retaining excellent characteristics of their own.

SUMMARY OF THE INVENTION

The first method for the preparation of ethylene polymer compositions according to the present invention is characterized in that an ethylene polymer composition having a density of 0.86–0.94 g/cm$^3$ and an intrinsic viscosity of 1–6 dl/g is obtained by carrying out a multi-stage process comprising a polymerization step (a): wherein ethylene is polymerized or ethylene and another α-olefin are copolymerized to form an ethylene polymer [I] having a density of higher than 0.88 g/cm$^3$ and an intrinsic viscosity [η] of 0.3–3 dl/g, and a polymerization step (b): wherein ethylene and another α-olefin are copolymerized to form an ethylene copolymer [II] having a density not higher than that of the ethylene polymer [I] and an intrinsic viscosity [η] of at least 1.5 times that of the ethylene polymer [I] and of 1–10 dl/g, in the presence of an olefin polymerization catalyst [I] composed of a transition metal compound [A] containing a ligand having a cycloalkadienyl skeleton and an organoaluminum oxy-compound [B] in such a manner that the polymerization step (b) is carried out in the presence of the polymerization product resulting from the polymerization step (a), or the polymerization step (a) is carried out in the presence of the polymerization product resulting from the polymerization step (b) so that the amount of polymerization in the above-mentioned two steps shall assume the proportion in terms of part by weight of the ethylene copolymer [II] to the ethylene polymer [I] being as 10–1000 to 100.

In accordance with the first method for the preparation of ethylene polymer compositions of the invention, there can be obtained ethylene polymer compositions excellent in melt properties.

The second method for the preparation of ethylene polymer compositions according to the present invention is characterized in that an ethylene polymer composition having a density of 0.87–0.93 g/cm$^3$ and an intrinsic viscosity of 0.5–6 dl/g is obtained by carrying out a multi-stage process comprising a polymerization step (c): wherein ethylene and another α-olefin are copolymerized in the presence of an olefin polymerization catalyst [II] composed of a transition metal compound [A] containing a ligand having a cycloalkadienyl skeleton and an organoaluminum oxy-compound [B] to obtain an ethylene copolymer [III] having a density lower than 0.91 g/cm$^3$ and an intrinsic viscosity [η] of 0.5–6 dl/g, and a polymerization step (d): wherein ethylene, or ethylene and another α-olefin are polymerized or copolymerized in the presence of an olefin polymerization catalyst [III] composed of a titanium catalyst component [C] containing titanium, magnesium and halogen as its essential ingredients, an organoaluminum compound [D] and/or an organoaluminum oxy-compound [E] to form an ethylene polymer [IV] having a density higher than that of the above-mentioned ethylene copolymer [III] and an intrinsic viscosity [η] of 0.5–6 dl/g, in such a manner that the polymerization step (d) is carried out in the presence of the ethylene copolymer [III] resulting from the polymerization step (c), or the polymerization step (c) is carried out in the presence of the ethylene polymer [IV] resulting from the polymerization step (d) so that the amount of polymerization in the above-mentioned two steps shall assume the proportion in terms of part by weight of the ethylene polymer [IV] to the ethylene copolymer [III] being as 10–1000 to 100.

In accordance with the second method for the preparation of ethylene polymer compositions of the present invention, there can be obtained ethylene polymer compositions excellent in anti-block properties and heat resistance despite the fact that they are low in density.

DETAILED DESCRIPTION OF THE INVENTION

The first method for the preparation of ethylene polymer compositions according to the present invention is illustrated below in detail.

In the first method for the preparation of ethylene polymer compositions of the invention, the olefin polymerization catalyst [I] composed of the transition metal compound [A] containing a ligand having a cycloalkadienyl skeleton and the organoaluminum oxy-compound [B] is used.

Figure 1:
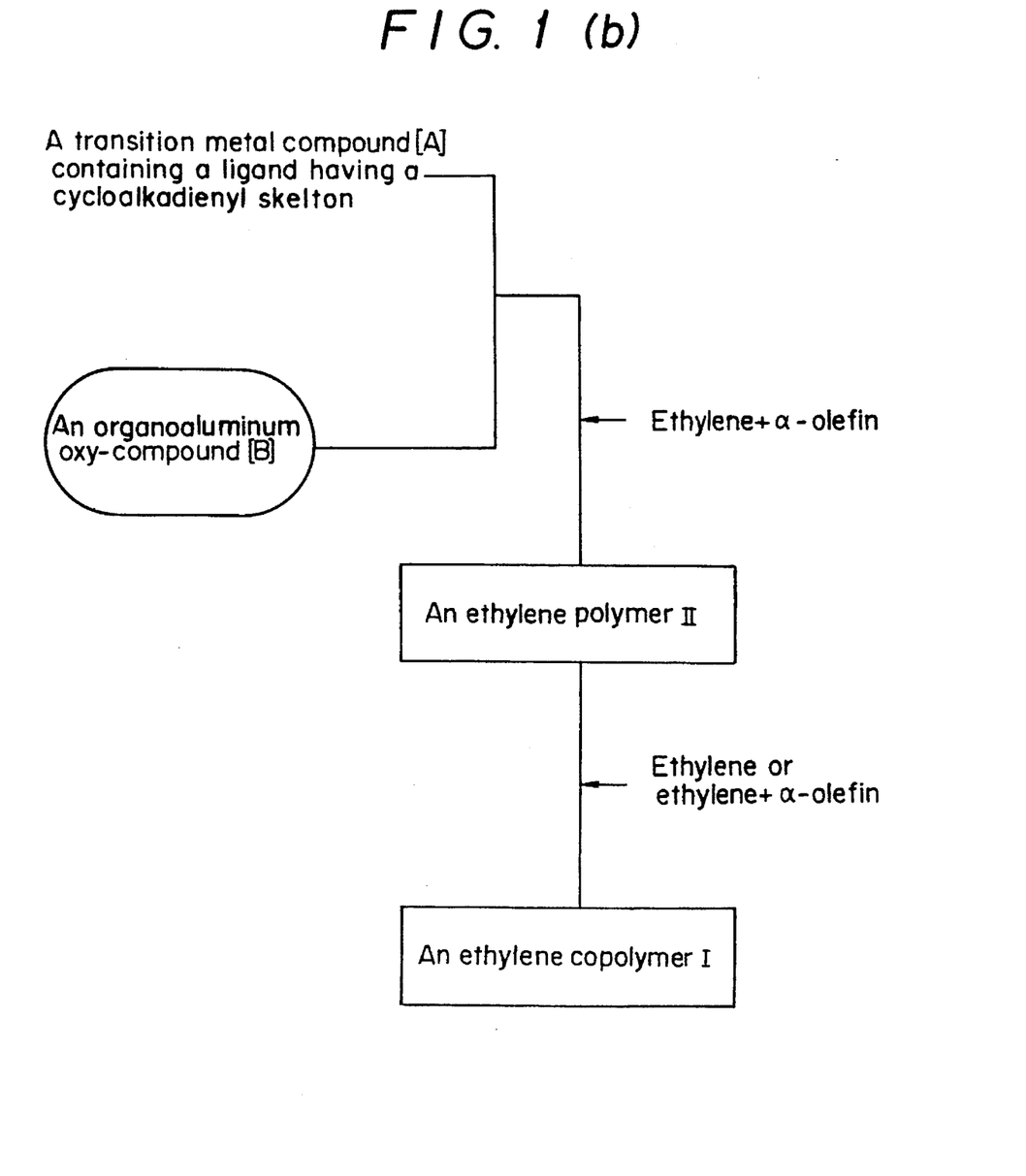
FIG. 1(a) and FIG. 1(b) are each a rough schematic drawing illustrating the first process for the preparation of ethylene polymer composition of the present invention.
Figure 1A:
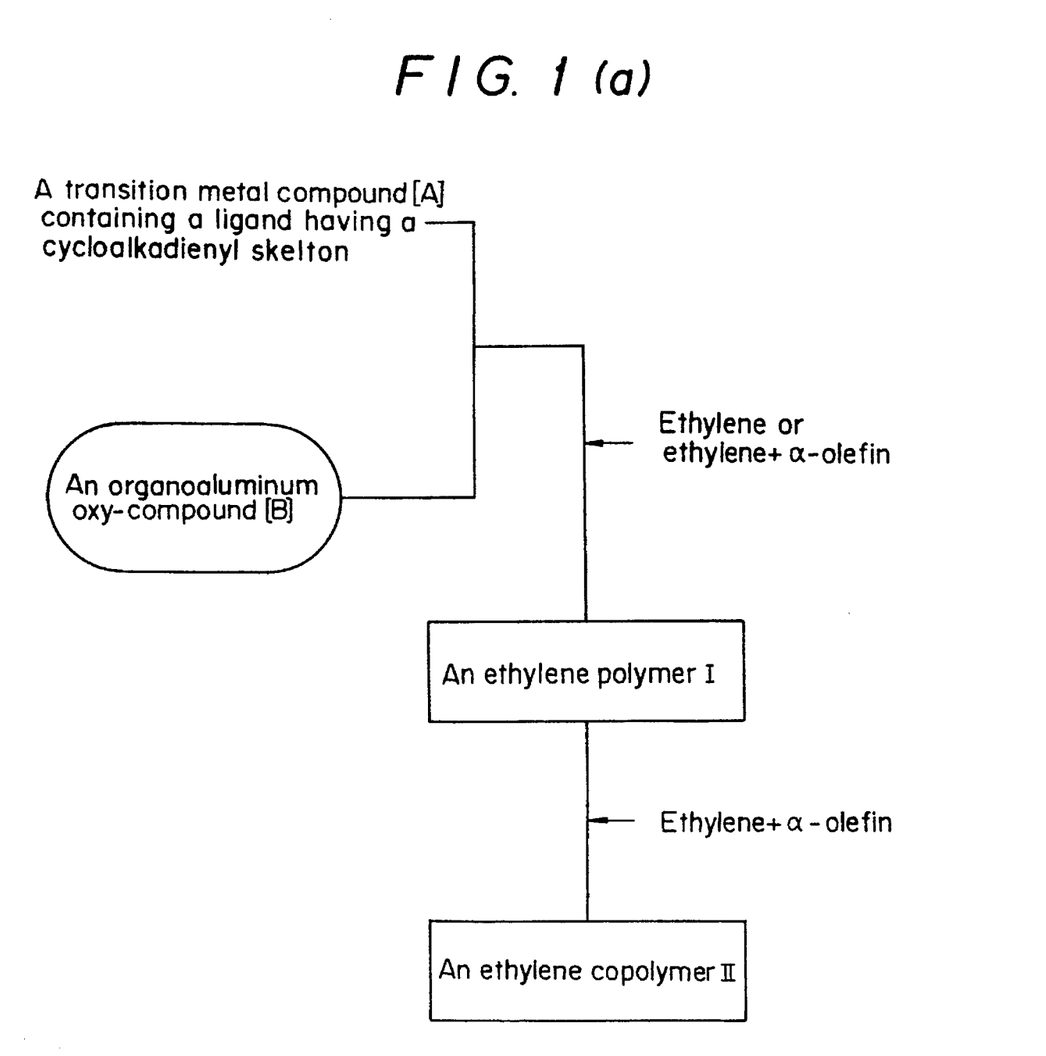

FIG. 1(a) and FIG. 1(b) each show a rough schematic drawing illustrating the first process for the preparation of ethylene polymer compositions of the present invention.

First, the transition metal compound [A] containing a ligand having a cycloalkadienyl skeleton used in the present invention is explained as follows. This transition metal compound [A] is represented by the formula $ML_x$ wherein M is a transition metal, L is a ligand coordinating to the transition metal, at least one of L is a ligand having a cycloalkadienyl skeleton, and when at least two or more ligands having a cycloalkadienyl skeleton are contained, at least two ligands having a cycloalkadienyl skeleton may be linked together via alkylene, substituted alkylene, silylene or substituted silylene, L other than the ligand having a cycloalkadienyl skeleton is a hydrocarbon group of 1–12 carbon atoms, alkoxy of 1–12 carbon atoms, aryloxy having not more than 12 carbon atoms, halogen or hydrogen, and x is a valence of the transition metal.

In the above-mentioned formula, M which is a transition metal includes zirconium, titanium, hafnium, chromium or vanadium by preference, and particularly preferred are zirconium and hafnium.

The ligands having a cycloalkadienyl skeleton include, for example, cyclopentadienyl, alkyl-substituted cyclopentadienyl such as methylcyclopentadienyl, ethylcyclopentadienyl, n-butylcyclopentadienyl, t-butylcyclopentadienyl, dimethylcyclopentadienyl and pentamethylcyclopentadienyl, and indenyl and fluorenyl.

Two or more ligands having a cycloalkadienyl skeleton as mentioned above may coordinate to the transition metal and, in this case, at least two ligands having a cycloalkadienyl skeleton may be linked together via alkylene, substituted alkylene, silylene or substituted silylene. The alkylene group includes methylene, ethylene, trimethylene and tetramethylene, the substituted alkylene includes isopropylidene, tetramethylethylene, and the substituted silylene includes dimethylsilylene, ethylmethylsilylene and diphenylsilylene.

The ligand other than those having a cycloalkadienyl skeleton is a hydrocarbon group of 1–12 carbon atoms, an alkoxy group of 1–12 carbon atoms, an aryloxy group having not more than 12 carbon atoms, halogen or hydrogen.

The hydrocarbon group having 1–12 carbon atoms mentioned above includes, for example, alkyl, cycloalkyl, aryl and aralkyl, and the alkyl group includes methyl, ethyl, propyl, isopropyl and butyl.

The cycloalkyl group mentioned above includes, for example, cyclopentyl and cyclohexyl, the aryl group includes, for example, phenyl and tolyl, and the aralkyl group includes, for example, benzyl and neophyl.

The alkoxy group mentioned above includes, for example, methoxy, ethoxy and butoxy, and the aryloxy group includes, for example, phenoxy.

The halogen mentioned above includes, for example, fluorine, chlorine, bromine and iodine.

Listed below are typical representatives of the transition metal compounds having a cycloalkadienyl skeleton, represented by the aforementioned formula $ML_x$ in which M is zirconium.

Bis(cyclopentadienyl)zirconium monochloride monohydride,

Bis(cyclopentadienyl)zirconium monobromide monohydride,

Bis(cyclopentadienyl)methyl zirconium hydride,

Bis(cyclopentadienyl)ethyl zirconium hydride,

Bis(cyclopentadienyl)phenyl zirconium hydride,

Bis(cyclopentadienyl)benzyl zirconium hydride,

Bis(cyclopentadienyl)neopentyl zirconium hydride,

Bis(methylcyclopentadienyl)zirconium monochloride hydride,

Bis(indenyl)zirconium monochloride monohydride,

Bis(cyclopentadienyl)zirconium dichloride,

Bis(cyclopentadienyl)zirconium dibromide,

Bis(cyclopentadienyl)methyl zirconium monochloride,

Bis(cyclopentadienyl)ethyl zirconium monochloride,

Bis(cyclopentadienyl)cyclohexyl zirconium monochloride,

Bis(cyclopentadienyl)phenyl zirconium monochloride,

Bis(cyclopentadienyl)benzyl zirconium monochloride,

Bis(methylcyclopentadienyl)zirconium dichloride,

Bis(dimethylcyclopentadienyl)zirconium dichloride,

Bis(n-butylcyclopentadienyl)zirconium dichloride,

Bis(indenyl)zirconium dichloride,

Bis(indenyl)zirconium dibromide,

Bis(cyclopentadienyl)zirconium dimethyl,

Bis(cyclopentadienyl)zirconium diphenyl,

Bis(cyclopentadienyl)zirconium dibenzyl,

Bis(cyclopentadienyl)zirconium methoxychloride,

Bis(cyclopentadienyl)zirconium ethoxychloride,

Bis(methylcyclopentadienyl)zirconium ethoxychloride,

Bis(cyclopentadienyl)zirconium phenoxychloride,

Bis(fluorenyl)zirconium dichloride,

Ethylenebis(indenyl)dimethyl zirconium,
Ethylenebis(indenyl)diethyl zirconium,
Ethylenebis(indenyl)diphenyl zirconium,
Ethylenebis(indenyl)methyl zirconium monochloride,
Ethylenebis(indenyl)ethyl zirconium monochloride,
Ethylenebis(indenyl)methyl zirconium monobromide,
Ethylenebis(indenyl)zirconium dichloride,
Ethylenebis(indenyl)zirconium dibromide,
Ethylenebis(4,5,6,7-tetrahydro-1-indenyl)dimethyl zirconium,
Ethylenebis(4,5,6,7-tetrahydro-1-indenyl)methyl zirconium monochloride,
Ethylenebis(4,5,6,7-tetrahydro-1-indenyl)zirconium dichloride,
Ethylenebis(4,5,6,7-tetrahydro-1-indenyl)zirconium dibromide,
Ethylenebis(4-methyl-1-indenyl)zirconium dichloride,
Ethylenebis(5-methyl-1-indenyl)zirconium dichloride,
Ethylenebis(6-methyl-1-indenyl)zirconium dichloride,
Ethylenebis(7-methyl-1-indenyl)zirconium dichloride,
Ethylenebis(5-methoxy-1-indenyl)zirconium dichloride,
Ethylenebis(2,3-dimethyl-1-indenyl)zirconium dichloride,
Ethylenebis(4,7-dimethyl-1-indenyl)zirconium dichloride,
Ethylenebis(4,7-dimethoxy-1-indenyl)zirconium dichloride,
Isopropylidene(cyclopentadienyl-fluorenyl)zirconium dichloride,
Isopropylidenebis(indenyl)zirconium dichloride,
Dimethylsilylenenbis(cyclopentadienyl)zirconium dichloride,
Dimethylsilylenebis(methylcyclopentadienyl)zirconium dichloride, and
Dimethylsilylenebis(indenyl)zirconium dichloride.

There may also be used transition metal compounds obtained by replacing the zirconium metal in the above-exemplified zirconium compounds with titanium metal, hafnium metal, or vanadium metal.

Next, the organoaluminum oxy-compound [B] is explained below. This organoaluminum oxy-compound [B] may be known aluminoxane or a benzene-insoluble organoaluminum oxy-compound first discovered by the present inventors.

The above-mentioned aluminoxane may be prepared, for example, by the following procedures.

(1) The procedure for recovering aluminoxanes as their solution in hydrocarbons which comprises reacting organoaluminum compounds such as trialkylaluminum with suspensions in hydrocarbon solvents of compounds having absorbed water or salts containing water of crystallization, for example, hydrates of magnesium chloride, copper sulfate, aluminum sulfate, nickel sulfate or cerous chloride.

(2) The procedure for recovering aluminoxanes as their solution in hydrocarbons which comprises allowing organoaluminum compounds such as trialkylaluminum to interact directly with water, ice or water vapor in solvents such as benzene, toluene, ethyl ether and tetrahydrofuran.

In this connection, the above-mentioned solution of aluminoxane may contain a small amount of organometallic components. Furthermore, the solution of aluminoxane recovered by the above-mentioned procedures may be distilled to remove therefrom the solvent or unreacted organoaluminum compound, followed by dissolving again in solvents.

The organoaluminum compounds used for preparing such solutions of aluminoxane as mentioned above include, for example, trialkylaluminum such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum, tridecylaluminum, tricyclohexylaluminum, tricyclooctylaluminum; dialkylaluminum halides such as dimethylaluminum chloride, diethylaluminum chloride, diethylaluminum bromide and diisobutylaluminum chloride; dialkylaluminum hydrides such as diethylaluminum hydride and diisobutylaluminum hydride; dialkylaluminum alkoxides such as dimethylaluminum methoxide and diethylaluminum ethoxide; and dialkylaluminum aryloxides such as diethylaluminum phenoxide.

Of the organoaluminum compounds as exemplified above, particularly preferred is trialkylaluminum.

Furthermore, there may also be used as the organoaluminum compound isoprenylaluminum represented by the general formula $$(i\text{-}C_4H_9)_x Al_y (C_5H_{10})_z$$

wherein x, y and z are each a positive number, and $z \geq 2x$.

The organoaluminum compounds mentioned above may be used either singly or in combination.

Solvents used in the solutions of aluminoxane include aromatic hydrocarbons such as benzene, toluene, xylene, cumene and cymeme; aliphatic hydrocarbons such as pentane, hexane, heptane, octane, decane, dodecane, hexadecane and octadecane; alicyclic hydrocarbons such as cyclopentane, cyclohexane, cyclooctane and methylcyclopentane; petroleum fractions such as gasoline, kerosene and gas oil. In addition thereto, there may also be used ethers such as ethyl ether and tetrahydrofuran. Of these solvents as exemplified above, particularly preferred are aromatic hydrocarbons.

The benzene-insoluble organoaluminum oxy-compounds used in the first process of the present invention contain an Al component which dissolves in benzene at 60° C. in an amount of less than 10%, preferably less than 5% and further desirably less than 2% in terms of Al atom, and it is insoluble or sparingly soluble in benzene.

Solubility in benzene of such organoaluminum oxy-compounds as mentioned above is obtained by suspending in 100 ml of benzene the organoaluminum oxy-compound in an amount corresponding to 100 mg atoms in terms of Al atom, mixing the resulting suspension at 60° C. for 6 hours, filtering the resulting mixture with G-5 glass filter equipped with a jacket kept at 60° C., and washing four times the solids portion separated on the filter with 50 ml of benzene at 60° C. to measure the amount (x mmol) of Al atoms present in the whole filtrate.

When the benzene-insoluble organoaluminum oxy-compounds of the present invention are analyzed by infrared spectrophotometry (IR), a ratio $(D_{1260}/D_{1220})$ of an absorbance $(D_{1260})$ at around 1260 cm$^{-1}$ to an absorbance $(D_{1220})$ at around 1220 cm$^{-1}$ is preferably less than 0.09, more preferably less than 0.08 and particularly in the range of from 0.04 to 0.07.

Infrared spectrophotometric analysis of the organoaluminum oxy-compounds as referred to in the present specification is carried out in the following manner.

First, the organoaluminum oxy-compound is ground, together with nujol, in a nitrogen box to paste.

Next, the paste-like sample thus obtained is put between KBr plates, and IR spectrum is measured in a nitrogen atmosphere by means of IR-810 manufactured and sold by Nippon Bunko K.K.

Figure 2:
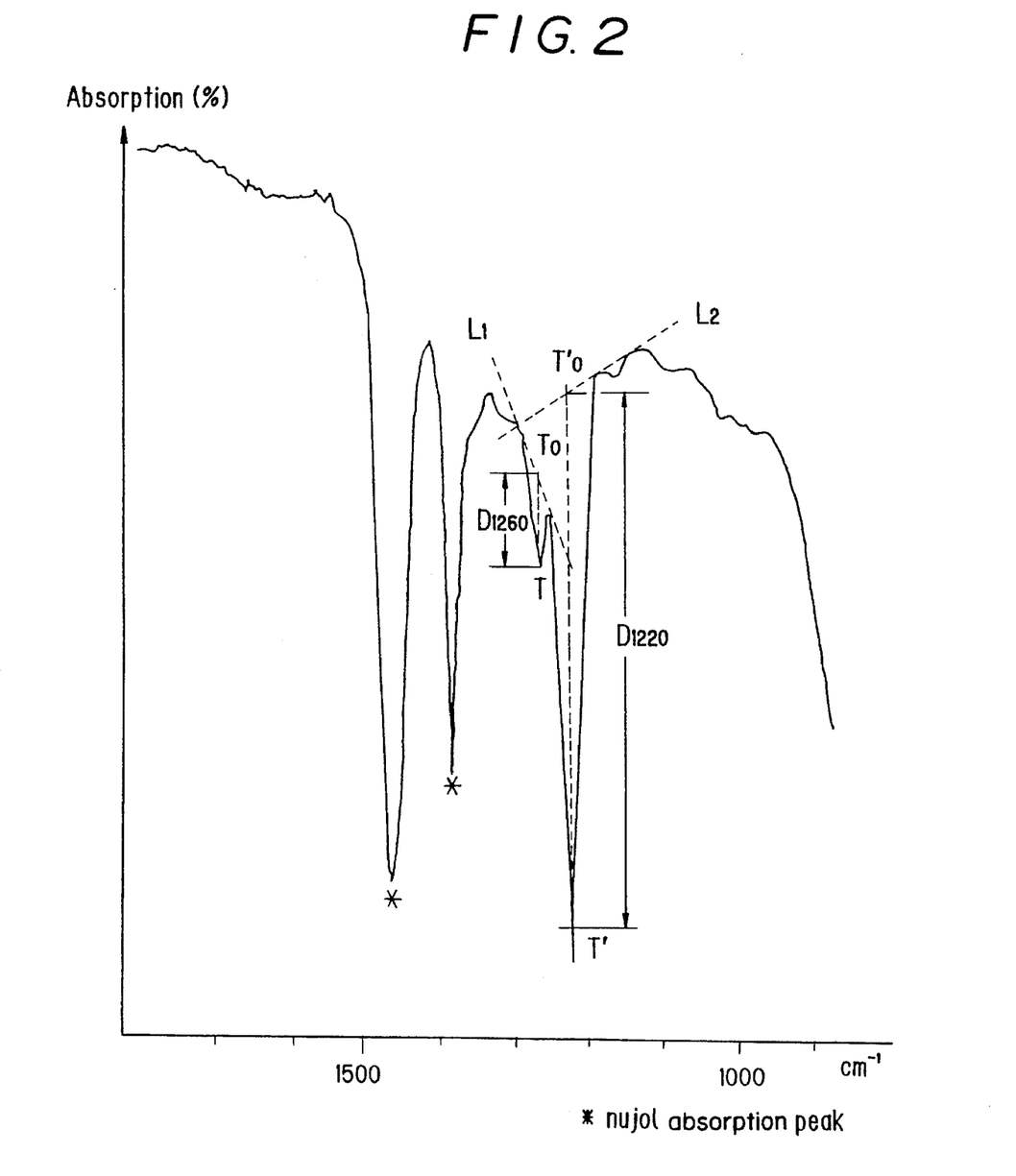
FIG. 2 is an IR spectrum of the benzene-insoluble organoaluminum oxy-compound.

IR spectrum of the organoaluminum oxy-compound according to the first process of the present invention as obtained is shown in FIG. 2.

From the thus obtained IR spectrum, a $D_{1260}/D_{1220}$ ratio is sought, and the ratio is obtained in the following manner.

(a) A line connecting a maximum point at around 1280 cm$^{-1}$ and a maximum point at around 1240 cm$^{-1}$ is taken as a base line $L_1$.

(b) A transmittance (T %) of an absorption minimum point at around 1260 cm$^{-1}$ and a transmittance ($T_0$ %) of a point of intersection are read, the point of intersection being obtained by drawing a vertical line from the absorption minimum point to a wave number abscissa axis (abscissa) and crossing the vertical line with the base line $L_1$, whereby an absorbance ($D_{1260}$=log $T_0/T$) is calculated.

(c) Similarly, a line connecting maximum points at around 1280 cm$^{-1}$ and at around 1180 cm$^{-1}$ is taken as a base line $L_2$.

(d) A transmittance (T' %) of an absorption minimum point at around 1220 cm$^{-1}$ and a transmittance (T'$_0$ %) of a point of intersection are read, the point of intersection being obtained by drawing a vertical line from the absorption minimum point to a wave number abscissa axis (abscissa) and crossing the vertical line with the base line $L_2$, whereby an absorbance ($D_{1220}$=log T'$_0$/T') is calculated.

(e) From these values as obtained, $D_{1260}/D_{1220}$ is calculated.

Figure 3:
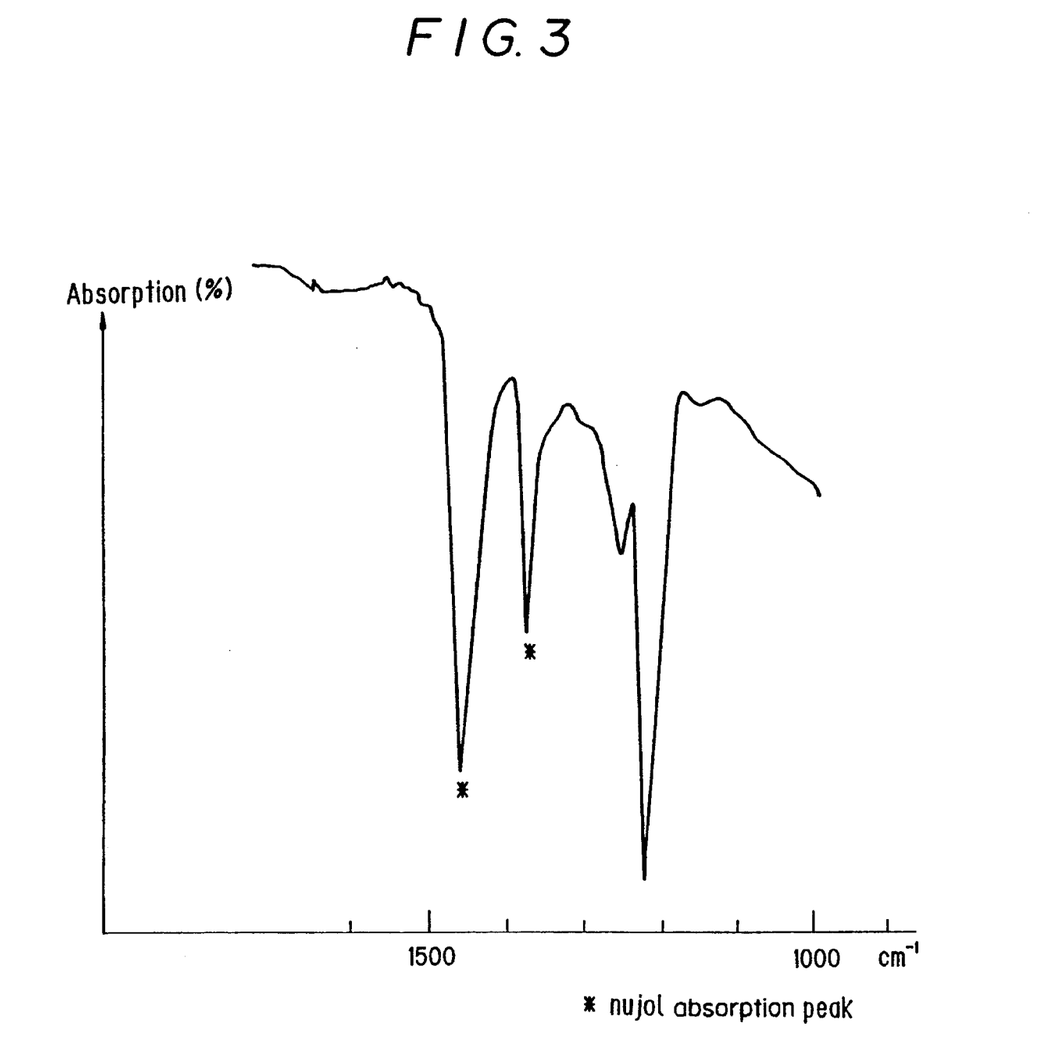
FIG. 3 is an IR spectrum of the benzene-soluble organoaluminum oxy-compound.

IR spectrum of a known benzene-soluble organoaluminum oxy-compound is shown in FIG. 3. As can be seen from FIG. 3, the benzene-soluble aluminum oxy-compound has a value of $D_{1260}/D_{1220}$ of being virtually 0.10–0.13, and thus the benzene-insoluble organoaluminum oxy-compound of the present invention is apparently different in value of $D_{1260}/D_{1220}$ from the known benzene-soluble organoaluminum oxy-compound.

The benzene-insoluble organoaluminum oxy-compounds used in the present invention are presumed to have an alkyloxyaluminum unit represented by the formula wherein R$^1$ is a hydrocarbon group of 1 to 12 carbon atoms.

In the above-mentioned alkyloxyaluminum unit, R$^1$ includes, for example, methyl, ethyl, n-propyl, isopropyl, n-butyl, isobutyl, pentyl, hexyl, octyl, decyl, cyclohexyl and cyclooctyl. Of these hydrocarbon groups exemplified above, preferred are methyl and ethyl, and particularly preferred is methyl.

In addition to the alkyloxyaluminum unit of the formula the benzene-insoluble organoaluminum oxy-compounds of the present invention may contain an oxyaluminum unit represented by the formula wherein R$^1$ is as defined above, and R$^2$ is a hydrocarbon group of 1 to 12 carbon atoms, an alkoxyl group of 1 to 12 carbon atoms, an aryloxy group of 6 to 20 carbon atoms, a hydroxyl group, halogen or hydrogen, provided that R$^1$ and R$^2$ are different from each other. In that case, the organoaluminum oxy-compounds desirably contain the alkyloxyaluminum unit in a proportion of at least 30 mol %, preferably at least 50 mol % and particularly at least 70 mol %.

The processes for preparing the benzene-insoluble organoaluminum oxy-compounds of the present invention are illustrated below in detail.

The benzene-insoluble organoaluminum oxy-compounds are obtained by bringing a solution of aluminoxane into contact with water or active hydrogen containing compounds.

The active hydrogen containing compounds include alcohols such as methanol, ethanol, n-propanol and isopropanol; diols such as ethylene glycol and hydroquinone; and organic acids such as acetic acid and propionic acid. Of these compounds, preferred are alcohols and diols, and especially preferred are alcohols.

Water or the active hydrogen containing compounds with which the solution of aluminoxane is brought into contact may be used as solutions or dispersions in hydrocarbon solvents such as benzene, toluene and hexane, ether solvents such as tetrahydrofuran or amine solvents such as triethylamine, or may be used in the form of vapor or solid. The water with which the solution of aluminoxane is brought into contact may be water of crystallization of salts such as magnesium chloride, magnesium sulfate, copper sulfate, nickel sulfate, iron sulfate and cerous chloride, or absorbed water absorbed to inorganic compounds such as silica, alumina and aluminum hydroxide or polymers.

Reaction of the solution of aluminoxane with water or the active hydrogen containing compounds is carried out usually in solvents, for example, hydrocarbon solvents. The solvents used in this case are aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclohexane; petroleum fractions such as gasoline, kerosene and gas oil; halogenated hydrocarbons such as halides of the above-mentioned aromatic hydrocarbons, aliphatic hydrocarbons and alicyclic hydrocarbons, particularly, chlorides and bromides; and ethers such as ethyl ether and tetrahydrofuran. Of these solvents as exemplified above, particularly preferred are aromatic hydrocarbons.

In the reaction as mentioned above, water or the active hydrogen containing compound is used in an amount of 0.1–5 moles, preferably 0.2–3 moles to 1 mole of Al atoms present in the solution of aluminoxane. A concentration in terms of aluminum atom in the reaction system is desirably 1×10$^{-3}$–5 gram atom/l, preferably 1×10$^{-2}$–3 gram atom/l, and a concentration of water in the reaction system is desirably 2×10$^{-4}$–5 mol/l, preferably 2×10$^{-3}$–3 mol/l.

The solution of aluminoxane may be brought into contact with water or the active hydrogen containing compound, for example, by the following procedures.

(1) A procedure which comprises bringing the solution of aluminoxane into contact with a hydrocarbon solvent containing water or the active hydrogen containing compound.

(2) A procedure which comprises blowing vapor of water or the active hydrogen containing compound into the solution of aluminoxane, thereby bringing the aluminoxane into contact with the vapor.

(3) A procedure which comprises bringing the solution of aluminoxane into contact directly with water, ice or the active hydrogen containing compound.

(4) A procedure which comprises mixing the solution of aluminoxane with a suspension of an absorbed water containing compound or a water of crystallization containing compound in hydrocarbon, or with a suspension of a compound, to which the active hydrogen containing compound has been absorbed, in hydrocarbon, thereby bringing the aluminoxane into contact with the absorbed water or water of crystallization.

The solution of aluminoxane may contain other components so long as they do not exert adverse effects on the reaction of aluminoxane with water or the active hydrogen containing compound.

The above-mentioned reaction of the solution of aluminoxane with water or the active hydrogen containing compound is carried out usually at $-50°$ to $150°$ C., preferably $0°–120°$ C. and more desirably at $20°–100°$ C. The reaction time employed is usually 0.5–300 hours, preferably 1–150 hours, though said reaction time varies largely depending upon the reaction temperature used.

The benzene insoluble organoaluminum oxy-compound may also be prepared by direct contact of organoaluminum with water. In the reaction mentioned above, water is used in such amount that the organoaluminum atom dissolved in the reaction system is less than 20%, based on total organoaluminum atom.

Water with which the organoaluminum compound is brought into contact may be used as solutions or dispersions in hydrocarbon solvents such as benzene, toluene and hexane, ether solvents such as tetrahydrofuran or amine solvents such as triethylamine, or may be used in the form of vapor or ice. The water with which the organoaluminum compound is brought into contact may be water of crystallization of salts such as magnesium chloride, magnesium sulfate, copper sulfate, nickel sulfate, iron sulfate and cerous chloride, or absorbed water absorbed to inorganic compounds such as silica, alumina and aluminum hydroxide or polymers.

Reaction of the organoaluminum compound with water is carried out usually in solvents, for example, hydrocarbon solvents. The solvents used in this case are aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclohexane; petroleum fractions such as gasoline, kerosene and gas oil; halogenated hydrocarbons such as halides of the above-mentioned aromatic hydrocarbons, aliphatic hydrocarbons and alicyclic hydrocarbons, particularly, chlorides and bromides; and ethers such as ethyl ether and tetrahydrofuran. Of these solvents as exemplified above, particularly preferred are aromatic hydrocarbons.

A concentration of organoaluminum compound in the reaction system in terms of aluminum atom is desirably $1\times10^{-3}$–5 gram atom/l, preferably $1\times10^{-2}$–3 gram atom/l, and a concentration of water in the reaction system is desirably $1\times10^{-3}$–5 mol/l, preferably $1\times10^{-2}$–3 mol/l.

In the reaction mentioned above, the organoaluminum atom dissolved in the reaction system is less than 20%, preferably less than 10%, more preferably 0 to 5% based on total organoaluminum atom.

The organoaluminum compound may be brought into contact with water, for example, by the following procedures.

(1) A procedure which comprises bringing the hydrocarbon solution of organoaluminum into contact with a hydrocarbon solvent containing water.

(2) A procedure which comprises blowing vapor of water into the hydrocarbon solution of organoaluminum, thereby bringing the organoaluminum into contact with the vapor.

(3) A procedure which comprises mixing the hydrocarbon solution of organoaluminum with a suspension of an absorbed water containing compound or a water of crystallization containing compound in hydrocarbon, thereby bringing the organoaluminum into contact with the absorbed water or water of crystallization.

(4) A procedure which comprises bringing the hydrocarbon solution of organoaluminum into contact directly with ice.

The hydrocarbon solution of organoaluminum may contain other components so long as they do not exert adverse effects on the reaction of organoaluminum with water.

The above-mentioned reaction of the organoaluminum with water is carried out usually at $-100°$ to $150°$ C., preferably $-70°$ to $100°$ C. and more desirably at $-50°$ to $80°$ C. The reaction time employed is usually 1 to 200 hours, preferably 2 to 100 hours, though the reaction time varies largely depending upon the reaction temperature used.

The first series of olefin polymerization catalysts according to the first method of the invention, if necessary, may contain an organoaluminum [C].

The organoaluminum compound [C] used herein includes such organoaluminum compounds, for example, as represented by the formula $R^6{}_n AlX_{3-n}$ wherein $R^6$ is hydrocarbon of 1–12 carbon atoms, X is halogen or hydrogen, and n is 1–3.

In the above-mentioned formula, $R^6$ is hydrocarbon of 1–12 carbon atoms, for example, alkyl, cycloalkyl or aryl, including concretely methyl, ethyl, n-propyl, isopropyl, isobutyl, pentyl, hexyl, octyl, cyclopentyl, cyclohexyl, phenyl, tolyl, etc.

The above-mentioned organoaluminum compounds will be exemplified below.

Trialkylaluminum such as trimethylaluminum, triethylaluminum, triisopropylaluminum, triisobutylaluminum, trioctylaluminum, tri-2-ethylhexylaluminum, etc.

Alkenylaluminum such as isoprenylaluminum, etc.

Dialkylaluminum halides such as dimethylaluminum chloride, diethylaluminum chloride, diisopropylaluminum chloride, diisobutylaluminum chloride, dimethylaluminum bromide, etc.

Alkylaluminum sesquihalides such as methylaluminum sesquichloride, ethylaluminum sesquichloride, butylaluminum sesquichloride, ethylaluminum sesquibromide, etc.

Alkylaluminum dihalides such as methylaluminum dichloride, ethylaluminum dichloride, isopropylaluminum dichloride, ethylaluminum dibromide, etc.

Alkylaluminum hydrides such as diethylaluminum hydride, di-isobutylaluminum hydride, etc.

Furthermore, there may also be used other organoaluminum compounds represented by the formula $R^6{}_n AlY_{3-n}$ wherein $R^6$ is as defined previously, Y is $-OR^7$, $-OSiR^8{}_3$, $-OAlR^9{}_2$, $-NR^{10}{}_2$, $-SiR^{11}{}_3$ or n is 1–2, $R^7$, $R^8$, $R^9$ and $R^{13}$ are each methyl, ethyl, isopropyl, isobutyl, cyclohexyl or phenyl, $R^{10}$ is hydrogen, methyl, ethyl, isopropyl, phenyl or trimethylsilyl, $R^{11}$ and $R^{12}$ are each methyl or ethyl.

The organoaluminum compounds as mentioned above include, for example, such compounds as enumerated below.

(i) Compounds of the formula $R^6_nAl(OR^7)_{3-n}$ such as dimethylaluminum methoxide, diethylaluminum ethoxide, diisobutylaluminum methoxide, etc.

(ii) Compounds of the formula $R^6_nAl(OSiR^8_3)_{3-n}$ such as $Et_2Al(OSiMe_3)$, $(iso-Bu)_2Al(OSiMe_3)$, $(iso-Bu)_2Al(OSiEt_3)$, etc.

(iii) Compounds of the formula $R^6_nAl(OAlR^9_2)_{3-n}$ such as $Et_2AlOAlEt_2$, $(iso-Bu)_2AlOAl(iso-Bu)_2$, etc.

(iv) Compounds of the formula $R^6_nAl(NR^{10}_2)_{3-n}$ such as $Me_2AlNEt_2$, $Et_2AlNHMe$, $Me_2AlNHEt$, $Et_2AlN(Me_3Si)_2$, $(iso-Bu)_2AlN(Me_3Si)_2$, etc.

(v) Compounds of the formula $R^6_nAl(SiR^{11}_3)_{3-n}$ such as $(iso-Bu)_2AlSiMe_3$, etc.

(vi) Compounds of the formula such as etc.

Of the organoaluminum compounds as exemplified above, preferred are those of the formula $R^6_3Al$, $R^6_nAl(OR^7)_{3-n}$ and $R^6Al(OAlR^9_2)_{3-n}$, particularly those in which $R^6$ is isoalkyl and n=2 are desirable. These organoaluminum compounds may be used in combination of two or more.

In this connection, the olefin polymerization catalysts as mentioned above may also be used after supporting them on a solid inorganic compound such as silica, alumina, magnesium oxide or magnesium chloride, or on a solid organic compound such as polyethylene, polypropylene or polystyrene.

In the first method of the present invention, ethylene polymers are prepared by a process divided into two stages, that is, the polymerization steps (a) and (b) as mentioned previously.

In the polymerization step (a), ethylene is homopolymerized or ethylene and another α-olefin are copolymerized to form an ethylene polymer [I] having a density of higher than 0.88 g/cm³, preferably 0.89–0.94 g/cm³ and an intrinsic viscosity [η] of 0.3–3 dl/g, preferably 0.5–2 dl/g.

In this ethylene polymer [I], it is desirable that the relationship between an amount (W) of the portion soluble at 23° C. in n-decane and a density (D) satisfies the following equation.

$\log W \leq -50 \times D + 46.4$, preferably $\log W \leq -50 \times D + 46.3$ and especially $\log W \leq -50 \times D + 46.2$.

In the polymerization step (b), ethylene and other α-olefin are copolymerized to form an ethylene copolymer [II].

Desirably, the density of the ethylene copolymer [II] is not higher than that of the ethylene polymer [I] obtained in the above-mentioned polymerization step (a), and is preferably lower by 0.005 g/cm³ than that of the ethylene polymer [I], and the intrinsic viscosity [η] of the ethylene copolymer [II] is at least 1.5 times, preferably 2–10 times that of the ethylene polymer [I], and is concretely 1–10 dl/g, preferably 1.5–7 dl/g.

Further, it is desirable that the relationship between a density D of the ethylene polymer [I], ethylene copolymer [II] or the whole polymer and a temperature T (°C.) showing the highest peak in an endothermic curve to be measured by a differential scanning calorimeter satisfies the following expression.

$T < 450 \times D - 297$, preferably $T < 500 \times D - 344$ and especially $T < 550 \times D - 391$.

The above-mentioned two polymerization steps (a) and (b) may be carried out in any order. That is, the ethylene copolymer [II] may be formed by carrying out the polymerization step (b) in the presence of the ethylene polymer [I] resulting from the polymerization step (a) which is first carried out, or the ethylene polymer [I] may be formed by carrying out the polymerization step (a) in the presence of the ethylene copolymer [II] resulting from the polymerization step (b) which is first carried out. In either case, these two steps must be carried out successively. In other words, the polymerization to be carried out in the latter stage must be carried out in the presence of the polymer formed by the polymerization carried out in the former stage. In this case, it is preferable in the latter polymerization step to use in succession the catalyst used in the former polymerization step without addition of a fresh catalyst, because there are obtained polymers in which the development of fish-eye has been minimized.

In practicing the polymerization steps (a) and (b), it is desirable to form the ethylene copolymer [II] in the polymerization step (B) so as to amount to 10–1000 parts by weight, preferably 20–500 parts by weight when the amount of the ethylene polymer [I] obtained in the polymerization step (a) is taken as 100 parts by weight.

Further, the intrinsic viscosity [η] of the whole polymer (including the ethylene polymer [I] and ethylene copolymer [II]) is 1–6 dl/g, preferably 1.2–4 dl/g, and the density thereof is 0.86–0.94 g/cm³, preferably 0.87–0.93 g/cm³ and especially 0.88–0.92 g/cm³. Furthermore, the ($MFR_{10}/MFR_2$) ratio of $MFR_{10}$ as measured at 190° C. under a load of 10 kg to $MFR_2$ as measured at 190° C. under a load of 2.16 kg is more than 7, preferably from 8 to 40.

The density D of the ethylene polymer [I] or ethylene copolymer [II] as referred to in the present invention was determined by means of a density gradient tube using the strand obtained at the time of MFR measurement under a load of 2.16 kg which has been heated at 120° C. for 1 hour, followed by gradual cooling up to room temperature over a period of 1 hour.

The intrinsic viscosity [η] of the above-mentioned polymer was measured at 135° C. in decalin. Further, the amount of n-decane-soluble portion of the above-mentioned polymer was determined in the following manner.

About 3 g of the copolymer as weighed is dissolved at 145° C. in 450 ml of n-decane, followed by gradual cooling up to 23° C. The solution is then filtered to remove a portion of the copolymer insoluble in n-decane therefrom, and the n-decane is distilled off from the filtrate, thereby obtaining an amount (percent by weight based on the whole copolymer) of an n-decane soluble portion of the copolymer.

The density ($D_2$), intrinsic viscosity $[\eta]_2$ and amount ($W_2$) of the polymer obtained in the second stage polymerization step were calculated according to the following equations, respectively.

$$[\eta]_2 = \frac{[\eta]_w - f_1 [\eta]_1}{f_2}$$

wherein $[\eta]_w$, $[\eta]_1$ and $[\eta]_2$ represent an intrinsic viscosity of the whole polymer, that of the polymer obtained in the first step and that of the polymer obtained in the second step, respectively, and $f_1$ and $f_2$ represent the amount of polymerization in the first step and that of the polymerization in the second step, respectively, and $f_1 + f_2$ is 1.

$$D_2 = \frac{f_2 D_w D_1}{D_1 - f_1 D_w}$$

wherein $D_w$, $D_1$ and $D_2$ represent a density of the whole polymer, that of the polymer obtained in the first stage, and that of the polymer obtained in the second stage, respectively.

$$W_2 = \frac{W_w - f_1 W_1}{f_2}$$

wherein $W_w$, $W_1$ and $W_2$ represent the amount of n-decane soluble portion of the whole polymer, that of the polymer obtained in the first stage, and that of the polymer obtained in the second stage, respectively.

In the present invention, moreover, pre-polymerization of olefin may also be carried out prior to the polymerization steps (a) and (b) as mentioned above. The pre-polymerization can be carried out under mild conditions using a suspension of olefin and the above-mentioned catalyst component [I] in an inert hydrocarbon medium.

The inert hydrocarbon medium used in this case may include, for example, aliphatic hydrocarbons such as propane, butane, pentane, hexane, heptane, octane, decane, dodecane, kerosine, etc.; alicyclic hydrocarbons such as cyclopentane, cyclohexane, methyl cyclopentane, etc.; aromatic hydrocarbons such as benzene, toluene, xylene, etc.; halogenated hydrocarbons such as ethylene chloride, chlorobenzene, etc.; or mixtures thereof. Of these inert hydrocarbon media as illustrated above, particularly preferred are aliphatic hydrocarbons. The pre-polymerization may be carried out by using the olefin as a medium or may also be carried out in a state substantially free from a medium.

Olefins used in the pre-polymerization may be the same as or different from those used in the main polymerization as will be mentioned later. Concretely, the olefin preferably used in the pre-polymerization is ethylene.

The reaction temperature employed in carrying out the pre-polymerization is usually from about −20° to +100° C., preferably from about −20° to +40° C.

In the pre-polymerization, a molecular weight modifier such as hydrogen may also be used. The molecular weight modifier is desirably used in such an amount that an intrinsic viscosity $[\eta]$, as measured in decalin at 135° C., of the polymer obtained by the pre-polymerization becomes more than about 0.2 dl/g, preferably from about 0.5 to 10 dl/g.

The pre-polymerization is desirably carried out in such a manner that the polymer is formed in an amount, based on 1 g of the above-mentioned solid catalyst, of about 0.1–500 g, preferably about 0.3–300 g and especially 1–100 g. If the pre-polymerization amount is made excessively large, the production efficiency of the olefin polymer in the main polymerization sometimes decreases.

Usable as α-olefins other than ethylene in the first process of the present invention are those having 3–20 carbon atoms, for example, propylene, 1-butene, 1-pentene, 1-hexene, 4-methyl-1-pentene, 1-octene, 1-decene, 1-dodecene, 1-tetradecene, 1-hexadecene, 1-octadecene, 1-eicosene, cyclopentene, cycloheptene, norbornene, 5-methyl-2-norbornene, tetracyclododecene, 2-methyl-1,4,5,8-dimethano-1,2,3,4,4a, 5,8,8a-octahydronaphthalene, etc.

In addition to such α-olefins as exemplified above, there may also be used styrene, vinylcyclohexane, diene, etc.

In the first process of the present invention, the polymerization may be carried out by any of polymerization techniques, for example, liquid phase polymerization such as solution of suspension polymerization or gas phase polymerization.

The reaction temperature of olefin using the olefin polymerization catalyst [I] is usually from −50° to 200° C., preferably from 0° to 150° C. The polymerization pressure is usually from ordinary pressure to 100 kg/cm$^2$, preferably from ordinary pressure to 50 kg/cm$^2$, and the polymerization reaction may be carried out by any of the batchwise, semicontinuous and continuous methods. The molecular weight of the olefin polymer obtained may be modified by the presence in the polymerization system of hydrogen or by changing the polymerization temperature employed.

In polymerizing olefin with the above-mentioned olefin polymerization catalyst [I], it is desirable to use the transition metal compound [A] containing a ligand having a cycloalkadienyl skeleton in an amount of usually $10^{-5}$–1 mmol, preferably $10^{-4}$–0.1 mmol, the organoaluminum oxy-compound [B] in an amount of usually 0.01–10 mmol, preferably 0.02–5 mmol, and the organoaluminum compound [C] in an amount of usually 0–10 mmol, preferably 0.1–5 mmol, each based on 1 liter of the reaction volume.

In the first process of the present invention, the olefin polymerization catalyst [I] may contain other components useful for olefin polymerization in addition to the above-mentioned components.

Next, the second method for the preparation of ethylene polymer compositions according to the present invention is illustrated below in detail.

Figure 4:
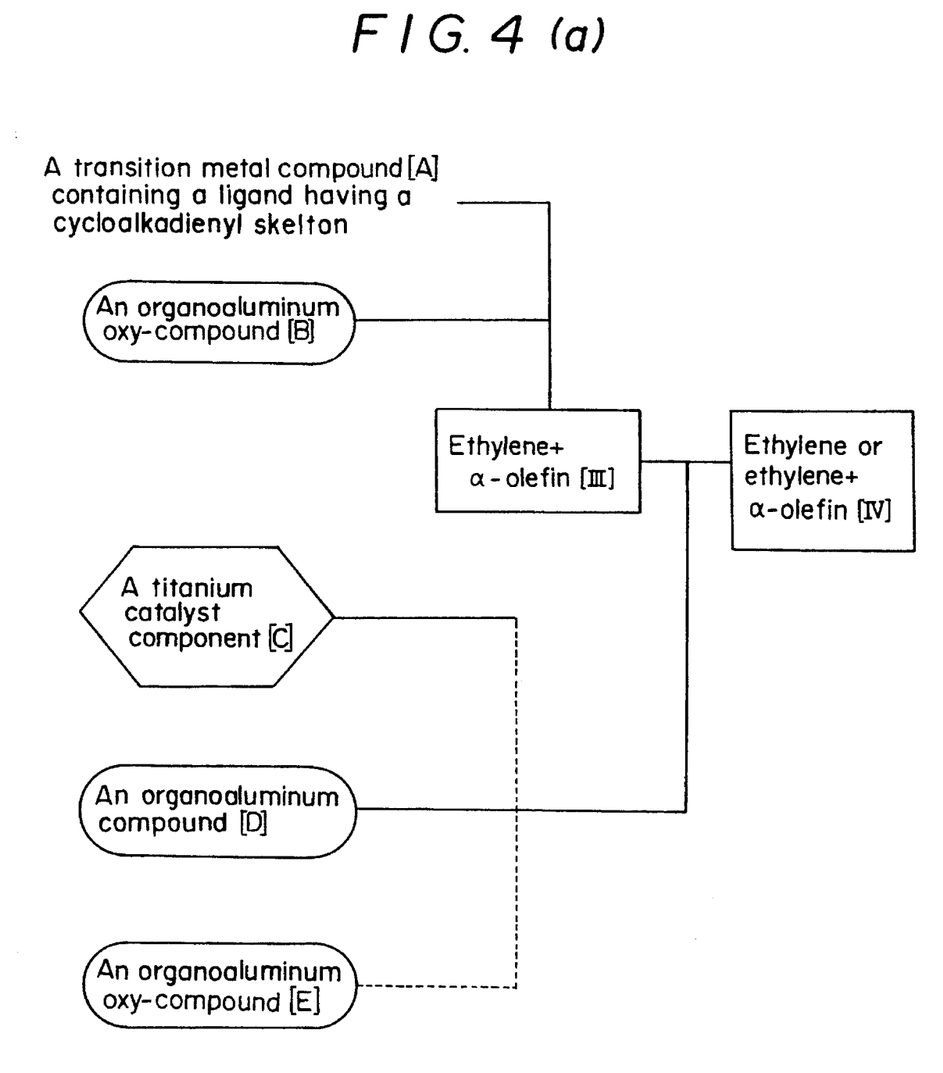
FIG. 4(a) and FIG. 4(b) are each a rough schematic drawing illustrating the second process for the preparation of ethylene polymer composition of the present invention.

FIG. 4(a) and FIG. 4(b) are each a rough schematic drawing illustrating the second process for the preparation of ethylene polymer compositions of the invention.

The second method for the preparation of ethylene polymer compositions of the invention comprises a polymerization step (c) and a polymerization step (d).

In the polymerization step (c), the olefin polymerization catalyst [II] composed of the transition metal compound [A] containing a ligand having a cycloalkadienyl skeleton and the organoaluminum oxy-compound [B] is used.

In the polymerization step (c), ethylene and other α-olefin are copolymerized with the olefin polymerization catalyst [II] to form an ethylene copolymer [III] having a density of not more than 0.91 g/cm$^3$, preferably 0.86–0.905 g/cm$^3$ more preferably 0.87–0.90 g/cm$^3$ and an intrinsic viscosity $[\eta]$ of 0.5–6 dl/g, preferably 0.7–4 dl/g.

In the polymerization step (c), the other α-olefin used may include those as used in the first method of the present invention.

This polymerization step (c) may be carried out by any of polymerization techniques, for example, liquid phase polymerization such as solution polymerization and suspension polymerization, and gas phase polymerization.

The polymerization of olefin with the olefin polymerization catalyst [II] may be carried out in the same manner as in the first method of the present invention as mentioned previously.

In the polymerization step (d), the olefin polymerization catalyst [III] composed of the titanium catalyst component [C] containing titanium, magnesium and halogen as its essential ingredients, the organoaluminum compound [D] and/or the organoaluminum oxy-compound [E] is used.

The titanium catalyst component [C] containing titanium, magnesium and halogen as its essential ingredients contains further an electron donor, if necessary.

Titanium compound useful for the preparation of the solid titanium catalyst component [C] includes tetravalent titanium compounds usually represented by the formula $Ti(OR)_gX_{4-g}$ (wherein R is a hydrocarbon group, X is halogen, and $0 \leq g \leq 4$). More particularly, these titanium compounds include titanium tetrahalides such as $TiCl_4$, $TiBr_4$, and $TiI_4$;

alkoxytitanium trihalides such as $Ti(OCH_3)Cl_3$, $Ti(OC_2H_5)Cl_3$, $Ti(O\ n\text{-}C_4H_9)Cl_3$, $Ti(O\ iso\text{-}C_4H_9)Cl_3$, $Ti(OC_2H_5)Br_3$, and $Ti(O\ iso\text{-}C_4H_9)Br_3$;

alkoxytitanium dihalides such as $Ti(OCH_3)_2Cl_2$, $Ti(OC_2H_5)_2Cl_2$, $Ti(O\ n\text{-}C_4H_9)_2Cl_2$, and $Ti(OC_2H_5)_2Br_2$; trialkoxytitanium monohalides such as $Ti(OCH_3)_3Cl$, $Ti(OC_2H_5)_3Cl$, $Ti(O\ n\text{-}C_4H_9)_3Cl$ and $Ti(OC_2H_5)_3Br$; and tetraalkoxytitanium such as $Ti(OCH_3)_4$, $Ti(OC_2H_5)_4$, $Ti(O\ n\text{-}C_4H_9)_4$, $Ti(O\ iso\text{-}C_4H_9)_4$ and $Ti(O\ 2\text{-ethylhexyl})_4$.

These titanium compounds may be used either singly or in admixture of two or more, and also they may be diluted, before use, with hydrocarbon compounds or halogenated hydrocarbon compounds.

Magnesium compounds useful for the preparation of the solid titanium catalyst component [C] used in the second process of the invention include those having reducing ability and those having no reducing ability.

The magnesium compounds having reducing ability as referred to herein include, for example, those having a magnesium-carbon bond or magnesium-hydrogen bond. Concrete examples of such magnesium compounds as having reducing ability include dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butyl ethoxy magnesium, ethyl butyl magnesium, octyl butyl magnesium, butylmagnesium halide, etc. The magnesium compounds exemplified above may be used singly, or may form complex compounds with organoaluminum compounds as will be mentioned later, and they also may be either liquid or solid.

Concrete examples of magnesium compounds having no reducing ability include halogenated magnesium such as magnesium chloride, magnesium bromide, magnesium iodide or magnesium fluoride; alkoxy magnesium halide such as methoxy magnesium chloride, ethoxy magnesium chloride, isopropoxy magnesium chloride, butoxy magnesium chloride or octoxy magnesium chloride; aryloxy magnesium halide such as phenoxy magnesium chloride, methylphenoxy magnesium chloride or dimethylphenoxy magnesium; alkoxy magnesium such as ethoxy magnesium, isopropoxy magnesium, butoxy magnesium, n-octoxy magnesium or 2-ethylhexoxy magnesium; and magnesium carboxylate such as magnesium laurate or magnesium stearate.

The magnesium compounds having no reducing ability exemplified above may be compounds derived from the above-mentioned magnesium compounds having reducing ability or compounds derived at the time of preparation of the catalyst component. The magnesium compound having no reducing ability may be derived from the magnesium compounds having reducing ability, for example, by bringing said magnesium compounds having reducing ability into contact with polysiloxane compounds, halogen containing silane compounds, halogen containing aluminum compounds or compounds such as esters, alcohols, etc.

The magnesium compounds used in the second process of the invention may also be complex or composite compounds of the above-mentioned magnesium compounds with other metals, or mixtures thereof. Further, the magnesium compounds used herein may also be mixtures of two or more of these compounds mentioned above.

Of these magnesium compounds exemplified above, preferred are those having no reducing ability, particularly halogen containing magnesium compounds. Of the halogen containing magnesium compounds, preferred are magnesium chloride, alkoxy magnesium halide and aryloxy magnesium halide.

In preparing the solid titanium catalyst component [C], it is preferable to use an electron donor. Useful electron donors include alcohols, amines, amides, ethers, ketones, esters, nitriles, phosphines, stibines, arsines, phosphoramides, thioethers, thioesters, acid anhydrides, acid halides, aldehydes, alcoholates, alkoxy(aryloxy)silanes and organic acids. Of these electron donors exemplified above, preferred are alcohols, amines, ethers, esters, acid anhydrides, alkoxy(aryloxy)silanes and organic acids.

The solid titanium catalyst component [C] may be prepared by bringing the above-mentioned magnesium compound (or metallic magnesium), titanium compound and, if necessary, electron donor into contact with one another. In preparing the solid titanium catalyst components, there may be employed the known method for the preparation of highly active titanium catalyst components from magnesium compounds, titanium compounds and, if necessary, electron donors. The above-mentioned components may be brought into contact with one another in the presence of other reaction reagents, for example, silicon, phosphorus and aluminum.

Briefly illustrated below are several examples of the process for the preparation of these solid titanium catalyst components.

In the following processes for the preparation of the solid titanium catalyst component [C] as will be illustrated below, the electron donor is used, but the use of the electron donor is not always necessary.

(1) A process wherein a magnesium compound or a complex compound comprising the magnesium compound and electron donor is allowed to react with the titanium compound in the liquid phase. In carrying out this reaction, each reactant may be pretreated with a reaction assistant such as the electron donor and/or an organoaluminum compound or a halogen containing silicon compound. In this process, the above-mentioned electron donor is used at least one time.

(2) A process wherein a liquid magnesium compound having no reducing ability is allowed to react with a liquid titanium compound in the presence of an electron donor, thereby separating out a solid magnesium titanium composite.

(3) A process wherein the reaction product obtained in the process (2) is allowed to react further with a titanium compound.

(4) A process wherein the reaction product obtained in the process (1) or (2) is allowed to react further with an electron donor and a titanium compound.

(5) A process wherein a solid product obtained by pulverizing a magnesium compound or a complex compound comprising a magnesium compound and an electron donor in the presence of a titanium compound is treated with any of halogen, a halogen compound and an aromatic hydrocarbon. In carrying out this process, the magnesium compound or the complex compound comprising the magnesium compound and the electron donor may be pulverized in the presence of a pulverized assistant. Further, after pulverizing the magnesium compound or the complex compound comprising the magnesium compound and the electron donor in the presence of the titanium compound, the solid product obtained thereby is pretreated with a reaction assistant, followed by treatment with halogen or the like. The reaction assistant used herein includes an organoaluminum compound or a halogen containing silicon compound. In this process, the electron donor is used at least one time.

(6) A process wherein the compound obtained in the processes (1)–(4) is treated with halogen, a halogen compound or an aromatic hydrocarbon.

(7) A process wherein a contact reaction product of a metallic oxide with dihydrocarbyl magnesium and a halogen containing alcohol is brought into contact with an electron donor and a titanium compound.

(8) A process wherein a magnesium compound such as magnesium salt of an organic acid, alkoxy magnesium or aryloxy magnesium is allowed to react with an electron donor, a titanium compound and/or a halogen containing hydrocarbon.

(9) A process wherein a catalyst component contained in a hydrocarbon solution at least comprising a magnesium compound, alkoxy titanium and/or an electron donor such as alcohol or ether are allowed to react with a titanium compound and/or a halogen containing compound such as a halogen containing silicon compound.

(10) A process wherein a liquid magnesium compound having no reducing ability is allowed to react with an organoaluminum compound to separate a solid magnesium aluminum composite, followed by reaction with a titanium compound.

Of the above-mentioned processes (1) to (10) for the preparation of the titanium catalyst component [C], preferred are the processes (1) to (4) and (10).

Further, there may be used a solution containing the mixture of a liquid magnesium compound having no reducing ability and a titanium compound.

The amount of each of the above-mentioned components used in the preparation of the solid titanium catalyst component [C] cannot be indiscriminately defined, because it varies according to the process employed. For example, however, there may be used, based on 1 mole of the magnesium compound, the electron donor in an amount of about 0.01–20 moles, preferably 0.05–10 moles, and the titanium compound in an amount of about 0.01–500 moles, preferably 0.05–300 moles.

The solid titanium catalyst component thus obtained contains magnesium, titanium, halogen and, if necessary, an electron donor, as its essential ingredients.

In the solid titanium catalyst component [C], Halogen/Ti (atomic ratio) is about 4–200, preferably about 5–100, the above-mentioned electron donor/Ti (molar ratio) is about 0.1–50, preferably about 0.2–25, and Mg/Ti (atomic ratio) is about 1–100, preferably 2–50.

In comparison with commercially available halogenated magnesium, the solid titanium catalyst component [C], contains halogenated magnesium having small crystal size whose specific surface area is usually larger than about 10 m²/g, preferably about 30–1000 m²/g and especially about 50–800 m²/g. This solid titanium catalyst component [C] does not substantially change in composition when it is washed with hexane, because the above-mentioned components used in the titanium catalyst component [C] are integrated into an integrated catalyst component.

The processes for the preparation of such highly active titanium catalyst components [C] as mentioned above are disclosed, for example, in Japanese Patent L-O-P Publns. Nos. 108385/1975, 126590/1975, 20297/1976, 28189/1976, 64586/1976, 2885/1976, 136625/1976, 87489/1977, 100596/1977, 147688/1977, 104593/1977, 2580/1978, 40093/1978, 40094/1978, 43094/1978, 135102/1980, 135103/1980, 152710/1980, 811/1981, 11908/1981, 18606/1981, 83006/1983, 138705/1983, 138706/1983, 138707/1983, 138708/1983, 138709/1983, 138710/1983, 138715/1983, 23404/1985, 195108/1985, 21109/1986, 37802/1986 and 37803/1986.

The titanium catalyst component [C] preferably has a polymerization activity for ethylene of 200 g-polymer/mmol-Titanium and preferably 500 g-polymer/mmol-Titanium.

The organoaluminum compound [D] used herein includes such organoaluminum compounds, for example, as represented by the formula $R^6_n AlX_{3-n}$ wherein $R^6$ is a hydrocarbon of 1–12 carbon atoms, X is halogen or hydrogen, and n is 1–3.

In the above-mentioned formula, $R^6$ is hydrocarbon of 1–12 carbon atoms, for example, alkyl, cycloalkyl or aryl, including concretely methyl, ethyl, n-propyl, isopropyl, isobutyl, pentyl, hexyl, octyl, decyl, cyclopentyl, cyclohexyl, phenyl, tolyl, etc.

The above-mentioned organoaluminum compounds will be exemplified below.

Trialkylaluminum such as trimethylaluminum, triethylaluminum, triisopropylaluminum, triisobutylaluminum, trihexylaluminum, trioctylaluminum, tri-2-ethylhexylaluminum, etc.

Alkenylaluminum such as isoprenylaluminum, etc.

Dialkylaluminum halides such as dimethylaluminum chloride, diethylaluminum chloride, diisopropylaluminum chloride, diisobutylaluminum chloride, dimethylaluminum bromide, etc.

Alkylaluminum sesquihalides such as methylaluminum sesquichloride, ethylaluminum sesquichloride, isopropylaluminum sesquichloride, butylaluminum sesquichloride, ethylaluminum sesquibromide, etc.

Alkylaluminum dihalides such as methylaluminum dichloride, ethylaluminum dichloride, isopropylaluminum dichloride, ethylaluminum dibromide, etc.

Alkylaluminum hydrides such as diethylaluminum hydride, di-isobutylaluminum hydride, etc.

Furthermore, there may also be used other organoaluminum compounds represented by the formula $R^6_n AlY_{3-n}$ wherein $R^6$ is as defined previously, Y is $-OR^7$, $-OSiR^8_3$, $-OAlR^5_2$, $-NR^{10}_2$, $-SiR^{11}_3$ or n is 1–2, $R^7$, $R^8$, $R^9$ and $R^{13}$ are each methyl, ethyl, isopropyl, isobutyl, cyclohexyl or phenyl, $R^{10}$ is hydrogen, methyl, ethyl, isopropyl, phenyl or trimethylsilyl, $R^{11}$ and $R^{12}$ are each methyl or ethyl.

The organoaluminum compounds as mentioned above include, in concrete, such compounds as enumerated below.

(i) Compounds of the formula $R^6_n Al(OR^7)_{3-n}$ such as dimethylaluminum methoxide, diethylaluminum ethoxide, diisobutylaluminum methoxide, etc.

(ii) Compounds of the formula $R^6{}_n Al(OSiR^8{}_3)_{3-n}$ such as $Et_2Al(OSiMe_3)$, $(iso-Bu)_2Al(OSiMe_3)$, $(iso-Bu)_2Al(OSiEt_3)$, etc.

(iii) Compounds of the formula $R^6{}_n Al(OAlR^9{}_2)_{3-n}$ such as $Et_2AlOAlEt_2$, $(iso-Bu)_2AlOAl(iso-Bu)_2$, etc.

(iv) Compounds of the formula $R^6{}_n Al(NR^{10}{}_2)_{3-n}$ such as $Me_2AlNEt_2$, $Et_2AlNHMe$, $Me_2AlNHEt$, $Et_2AlN(Me_3Si)_2$, $(iso-Bu)_2AlN(Me_3Si)_2$, etc.

(v) Compounds of the formula $R^6{}_n Al(SiR^{11}{}_3)_{3-n}$ such as $(iso-Bu)_2AlSiMe_3$, etc.

(vi) Compounds of the formula such as etc.

Of the organoaluminum compounds as exemplified above, preferred are those of the formula $R^6{}_3Al$, $R^6{}_n Al(OR^7)_{3-n}$ and $R^6 Al(OAlR^9{}_2)_{3-n}$, particularly those in which $R^6$ is isoalkyl and n=2 are desirable. These organoaluminum compounds may be used in combination of two or more.

The organoaluminum oxy-compound [E] used in the polymerization step (d) is the same as the organoaluminum oxy-compound [B] used in the polymerization step (c).

The polymerization step (d) may also be carried out by using the olefin polymerization catalyst [III] containing the electron donor as mentioned above in addition to the above-mentioned titanium catalyst component [C], organoaluminum compound [D] and/or organoaluminum oxy-compound [E].

In the polymerization step (d), using the above-mentioned olefin polymerization catalyst [III], ethylene is homopolymerized or ethylene and another α-olefin are copolymerized to form an ethylene polymer [IV] having a density higher than that of the above-mentioned ethylene copolymer [III] formed in the polymerization step (c), preferably a density of 0.90–0.94 g/cm³ and especially 0.91–0.93 g/cm³, and an intrinsic viscosity [η] of 0.5–6 dl/g, preferably 0.7–4 dl/g. In the ethylene polymer [IV] thus formed, the amount of the portion soluble in n-decane at 23° C. is desirably 0.1–10%.

Usable as α-olefins other than ethylene in the polymerization step (d) are those as exemplified in the case of the polymerization step (c).

The polymerization step (d) may be carried out by any of polymerization techniques, for example, liquid phase polymerization such as solution or suspension polymerization, or gas phase polymerization. Of these polymerization techniques, particularly preferred is solution polymerization.

The polymerization temperature of olefin using the above-mentioned olefin polymerization catalyst [III] is usually from 0° C. to 250° C., preferably from 50° C. to 200° C. The polymerization pressure is usually from ordinary pressure to 100 kg/cm², preferably from ordinary pressure to 50 kg/cm², and the polymerization reaction may be carried out by any of the batchwise, semi-continuous and continuous methods. The molecular weight of the olefin polymer obtained may be modified by the presence of hydrogen atoms or changing in the polymerization temperature employed.

In polymerizing olefin with the above-mentioned olefin polymerization catalyst [III], it is desirable to use the titanium catalyst component [C] in an amount, based on 1 liter of the polymerization volume, of usually about $10^{-4}$–0.5 mmol, preferably about $10^{-3}$–0.1 mmol in terms of Ti atom, the organoaluminum compound [D] in such an amount that aluminum atom becomes usually 1–2000 moles, preferably 5–500 moles based on 1 mole of titanium atom, and the organoaluminum oxy-compound [E] in such an amount that aluminum atom becomes usually 4–2000 moles, preferably 10–500 moles based on 1 mole of titanium atom.

The above-mentioned two polymerization steps (c) and (d) may be carried out in any order. That is, the ethylene polymer [IV] may be formed by carrying out the polymerization step (d) in the presence of the ethylene copolymer [III] resulting from the polymerization step (c) first carried out, or the ethylene copolymer [III] may be formed by carrying out the polymerization step (c) in the presence of the ethylene copolymer [IV] resulting from the polymerization step (d) first carried out. In either case, these two steps must be carried out successively. In other words, the polymerization to be carried out in the latter stage must be carried out in the presence of the polymer formed by the polymerization carried out in the former stage. In the present invention, it is preferable to carry out first the polymerization step (c), followed by the polymerization step (d).

In practicing the polymerization steps (c) and (d), it is desirable to form the ethylene polymer [IV] in the polymerization step (d) so as to amount to 10–1000 parts by weight, preferably 20–500 parts by weight when the amount of the ethylene copolymer [III] obtained in the polymerization step (c) is taken as 100 parts by weight.

Further, the intrinsic viscosity [η] of the whole polymer (including the ethylene polymer [III] and ethylene copolymer [IV]) is 0.5–6 dl/g, preferably 0.7–4 dl/g, and the density of the whole polymer is 0.87–0.94 g/cm³, preferably 0.88–0.93 g/cm³ and especially 0.89–0.92 g/cm³.

In the whole polymer as mentioned above, it is desirable that parts of the melt temperature curve as measured by means of DSC are observed at a level of 110° C. or higher, preferably 115°–125° C., and the relationship between the amount of portion soluble in n-decane at 23° C. (Ww) and the density (Dw) satisfies log Ww≦−50×Dw+45.9, preferably log Ww≦−50×Dw+45.8 and especially log Ww≦−50×Dw+45.7.

The density $D_1$ of the ethylene polymer [III] or ethylene copolymer [IV] obtained in the polymerization step (c) of the first stage as referred to in the present specification was determined by means of a density gradient tube using a strand obtained at the time of MFR measurement under a load of 2.16 kg, the strand having been heat treated at 120° C. for 1 hour, followed by gradual cooling to room temperature over a period of 1 hour.

The intrinsic viscosity [η] and the amount soluble in n-decane of the above-mentioned polymer were measured in accordance with the method illustrated already in the case of the first process of the present invention.

The copolymers are excellent in anti-block properties when they have a smaller amount soluble in n-decane.

The density $(D_2)$, intrinsic viscosity $[\eta]_2$ and amount $(W_2)$ soluble in n-decane of the polymer obtained in the polymerization step (d) of the second stage as referred to in the present specification were also measured in the same manner as illustrated already in the case of the first process of the present invention.

A melting point of the copolymer as determined by means of DSC was used as a measure of heat resistance of said copolymer.

In the second method of the present invention, the olefin polymerization catalyst [II] or [III] used may also contain other components useful for olefin polymerization in addition to the above-mentioned components. The same prepolymerization as mentioned previously may also be carried out in the second method of the present invention prior to the above-mentioned polymerization steps (c) and (d).

The present invention is illustrated below with reference to examples, but it should be construed that the invention is in no way limited to those examples.

EXAMPLE 1

(Preparation of Organoaluminum Oxy-compound [B])

A 400 ml glass flask thoroughly purged with nitrogen was charged with 37.1 g of $Al_2(SO_4)_3 \cdot 14H_2O$ and 133 ml of toluene, cooled to $-5°$ C., and 47.9 ml of trimethylaluminum diluted with 152 ml of toluene was added dropwise over a period of 1 hour, followed by reaction at a temperature of from 0° to $-5°$ C. for 1 hour. The temperature of the flask was then elevated to 40° C. over a period of 3 hours, and the reaction was continued at that temperature for 72 hours. After completion of the reaction, the reaction mixture was subjected to solid-liquid separation by filtration, and the toluene was removed from the filtrate to obtain a white solid organoaluminum oxy-compound.

(Polymerization)

A 2-liter stainless steel autoclave thoroughly purged with nitrogen was charged with 900 ml of 4-methyl-1-pentene, followed by a rise in temperature of the system of up to 55° C. Into the autoclave were then injected 1.0 mmol of triisobutylaluminum, 0.1 mg atom of the organoaluminum oxy-compound in terms of aluminum atom and 0.001 mmol of bis(methylcyclopentadienyl)zirconium dichloride together with ethylene to initiate polymerization. The polymerization was carried out at the total pressure of 8 kg/cm$^2$ G and 60° C. for 10 minutes while continuously feeding ethylene to the polymerization system [step (b)]. Immediately after the 10-minute polymerization, 0.25 Nl of hydrogen together with ethylene was injected into the autoclave to carry out the polymerization at a total pressure of 12 kg/cm$^2$ G and 60° C. for 25 minutes [step (a)]. The polymerization was stopped by the addition to the polymerization system of small amounts of methanol, and the resulting polymer solution was poured into large amounts of methanol to separate polymer therefrom. The polymer was then recovered and vacuum dried at 80° C. overnight. As a result, there was obtained 53.5 g of an ethylene/4-methyl-1-pentene copolymer having [η] of 1.82 dl/g, a density of 0.901 g/cm$^3$, MFR$_2$ of 0.82 g/10 min, MFR$_{10}$/MFR$_2$ of 10.5 a melting point at 95° C. and an amount of portion soluble in n-decane of 1.6% by weight.

Separately, only the above-mentioned step (b) was carried out. As a result, there was obtained 15.5 g of an ethylene/4-methyl-1-pentene copolymer having [η] of 3.30 dl/g, a density of 0.892 g/cm$^3$, an amount of portion soluble in n-decane of 3.9% by weight and a melting point of 87° C. From the results obtained in the above step (b), it was found by calculation that the ethylene/4-methyl-1-pentene copolymer obtained in the above step (a) amounted to 38.0 g, having [η] of 1.22 dl/g, a density of 0.905 g/cm$^3$ and an amount of portion soluble in n-decane of 0.66% by weight.

COMPARATIVE EXAMPLE 1

(Polymerization)

Only the step (b) of Example 1 was repeated except that the polymerization was carried out at 100° C. for 40 minutes and at the total pressure of 12 kg/cm$^2$ G, whereby 32.8 g of an ethylene/4-methyl-1-pentene copolymer having [η] of 1.85 dl/g, a density of 0.902 g/cm$^3$, MFR$_2$ of 0.75 g/10 min, MFR$_{10}$/MFR$_2$ of 6.0, a melting point of 94° C., and an amount of portion soluble in n-decane of 1.1% by weight was obtained.

EXAMPLE 2

(Polymerization)

Immediately after completion of the step (b) of Example 1, the flask was charged with 0.2 Nl of hydrogen to carry out polymerization at the total pressure of 10 kg/cm$^2$ G and 60° C. for 25 minutes [step (a)]. Thereafter, the same operation as in Example 1 was conducted to obtain 44.3 g of an ethylene/4-methyl-1-pentene copolymer having [η] of 1.87 dl/g, a density of 0.897 g/cm$^3$, MFR$_2$ of 0.65 g/10 min, MFR$_{10}$/MFR$_2$ of 9.8, a melting point of 92° C., and an amount of portion soluble in n-decane of 2.4% by weight.

From the results obtained in the above step (a), it was found by calculation that the ethylene/4-methyl-1-pentene copolymer obtained in the step (a) amounted to 28.8 g, having [η] of 1.10 dl/g, a density of 0.900 g/cm$^3$ and an amount of portion soluble in n-decane of 1.6% by weight.

EXAMPLE 3

(Preparation of titanium catalyst component [C])

To a suspension of 1 mole of commercially available anhydrous magnesium chloride in 2 liters of hexane was added dropwise with stirring in a nitrogen atmosphere 6 moles of ethanol over a period of 1 hour, followed by reaction at room temperature for 1 hour. To the reaction mixture was added dropwise 2.6 moles of diethylaluminum chloride at room temperature, followed by stirring for 2 hours. After addition thereto of 6 moles of titanium tetrachloride, the temperature of the system was elevated to 80° C., and the reaction was carried out with stirring at that temperature for 3 hours. After completion of the reaction, solids formed were separated from the reaction mixture, followed by repeated washing with hexane. To 200 ml of a decane suspension containing 5 mmoles in terms of titanium atom of the thus obtained solid component (Ti: 3.4 wt %, Mg: 21 wt %) was added dropwise at room temperature 45.6 mmoles of ethanol, followed by reaction at 90° C. for 1 hour. After cooling the system to room temperature, 15 mmoles of triethylaluminum, was added and reaction was carried out at room temperature for 1 hour to obtain the captioned titanium catalyst component [C].

(Preparation of organoaluminum oxy-compound [B])

A 400 ml glass flask thoroughly purged with nitrogen was charged with 37.1 g of $Al_2(SO_4)_3 \cdot 14H_2O$ and 133 ml of toluene, cooled to $-5°$ C., and 47.9 ml of trimethylaluminum diluted with 152 ml of toluene was added dropwise over a period of 1 hour, followed by reaction at a temperature of from 0° to $-5°$ C. for 1 hour. The temperature of the flask was then elevated to 40° C. over a period of 3 hours, and the reaction was continued at that temperature for 72 hours.

After completion of the reaction, the reaction mixture was subjected to solid-liquid separation by filtration, and the toluene was removed from the filtrate to obtain a white solid benzene-soluble organoaluminum oxy-compound.

A 400 ml glass flask was charged with 58.4 ml of a solution of the benzene-soluble organoaluminum oxy-compound obtained above in toluene (Al=2.57 mol/l), 90.5 ml of toluene and 25 g of Teflon columns (1.2 mm of length×2 mm of diameter). The temperature of the flask was cooled to 5° C., and 1.08 ml of water was added dropwise over a period of 20 minutes. In that case, the temperature inside the flask was maintained at from 0° C. to −5° C. After completion of the dropwise addition of water the temperature of the flask was elevated up to 80° C. over a period of 30 minutes, and the reaction was carried out at that temperature for 3 hours. Thereafter, the Teflon columns were removed by means of a 32-mesh screen from the reaction mixture to obtain a benzene-insoluble organoaluminum oxy-compound having a solubility in benzene at 60° C. of 0.4 wt % and a $D_{1260}/D_{1220}$ ratio as measured by IR of 0.053.

(Polymerization)

A 2-liter stainless steel autoclave thoroughly purged with nitrogen was charged with 900 ml of 4-methyl-1-pentene, followed by rise in temperature of the system up to 75° C. Into the autoclave were then injected 0.5 mmole of triisobutylaluminum, 0.1 mg atom in terms of aluminum atom of the benzene-insoluble organoaluminum oxy-compound and 0.001 mmole of bis(methylcyclopentadienyl)zirconium dichloride together with ethylene to initiate polymerization. The polymerization was carried out at the total pressure of 8 kg/cm².G and 80° C. for 40 minutes while continuously feeding ethylene to the autoclave [step(c)]. Immediately thereafter, 180 ml of the polymer solution obtained above was injected together with ethylene into another autoclave having been used in the step (c), and which had been charged with 800 ml of cyclohexane, 0.5 Nl of hydrogen and 0.3 mmole of ethylaluminum sesquichloride, and heated to 170° C., and then 0.003 mg atom in terms of titanium atom of the titanium catalyst component prepared above was injected thereinto together with ethylene to initiate polymerization again. The polymerization was carried out at the total pressure of 25 kg/cm².G and 170° C. for 15 minutes while continuously feeding ethylene to the autoclave [step (d)]. The polymerization was stopped by the addition to the polymerization system of small amounts of methanol, and the resulting polymer solution was poured in large amounts of methanol to separate polymer. The polymer was then recovered therefrom, and vacuum dried at 80° C. overnight. As a result, there was obtained 25.3 g of an ethylene/4-methyl-1-pentene copolymer having [η] of 1.63 dl/g, a density of 0.905 g/cm³, an amount of portion soluble in n-decane of 2.7 wt %, and a peak of melting point, as measured by means of DSC, appearing at 122°, 112° and 93° C.

Separately, only the step (c) mentioned above was repeated to recover the resulting polymer from 180 ml of the polymer solution obtained thereby. As a result, there was obtained 9.6 g of an ethylene/4-methyl-1-pentene copolymer having [η] of 1.80 dl/g, a density of 0.891 g/cm³, an amount of portion soluble in n-decane of 4.3 wt %, and a melting point of 83° C. From the results obtained in this step (c), it was found by calculation that the ethylene/4-methyl-1-pentene copolymer obtained in the step (d) mentioned above amounted to 15.7 g, having [η] of 1.53 dl/g, a density of 0.914 g/cm³, and an amount of portion soluble in n-decane of 1.7 wt %.

COMPARATIVE EXAMPLE 2

A 2-liter stainless steel autoclave thoroughly purged with nitrogen was charged with 900 ml of 4-methyl-1-pentene, followed by a rise in temperature of the system to 90° C. Into the autoclave were injected 1.0 mmole of triisobutylaluminum, 0.2 mg atom in terms of aluminum atom of the benzene-insoluble organoaluminum oxy-compound prepared in Example 3 and 0.002 mmole of bis(cyclopentadienyl)zirconium dichloride together with ethylene to initiate polymerization. The polymerization was carried out at the total pressure of 20 kg/cm².G and 100° C. for 40 minutes while continuously feeding ethylene to the autoclave, whereby 91.0 g of an ethylene/4-methyl-1-pentene copolymer having [η] of 1.56 dl/g, a density of 0.907 g/cm³, an amount of portion soluble in n-decane of 0.65 wt %, and a melting point of 97° C. was obtained.

COMPARATIVE EXAMPLE 3

A 2-liter stainless steel autoclave thoroughly purged with nitrogen was charged with 200 ml of 4-methyl-1-pentene, 800 ml of cyclohexane and 0.5 Nl of hydrogen, followed by a rise in temperature of the system to 160° C. Into the autoclave were then injected 0.35 mmole of ethylaluminum sesquichloride and 0.013 mg atom in terms of titanium atom of the titanium catalyst component prepared in Example 3 together with ethylene to initiate polymerization. The polymerization was carried out at the total pressure of 25 kg/cm².G and 170° C. for 40 minutes while continuously feeding ethylene to the autoclave, whereby 115 g of an ethylene/4-methyl-1-pentene copolymer having [η] of 1.40 dl/g, a density of 0.908 g/cm³, an amount of portion soluble in n-decane of 3.9 wt %, and a melting point of 122.7°, 112.6° and 96° C. was obtained.

EXAMPLE 4

The step (d) of the polymerization of Example 3 was repeated except that the amount of the titanium catalyst used was changed to 0.005 mg atom in terms of titanium atom, whereby 36.9 g of an ethylene/4-methyl-1-pentene copolymer having [η] of 1.55 dl/g, a density of 0.907 g/cm³, an amount of portion soluble in n-decane of 2.5 wt % and a melting point of 122°, 114° and 94° C. was obtained.

In this connection, it was found by calculation that the ethylene/4-methyl-1-pentene copolymer obtained in the step (d) amounted to 27.3 g, having [η] of 1.46 dl/g, a density of 0.913 g/cm³ and an amount of portion soluble in n-decane of 1.9 wt %.

What is claimed is:

1. A method for the preparation of an ethylene polymer composition having a density of 0.87–0.93 g/cm³ and an intrinsic viscosity [η] of 0.5–6 dl/g, which comprises carrying out a multi-stage process comprising a polymerization step (c): wherein ethylene and other α-olefin are copolymerized using an olefin polymerization catalyst [II] composed of a transition metal compound [A] containing a ligand having a cycloalkadienyl skeleton and an organoaluminum oxy-compound [B] to form an ethylene copolymer [III] having a density of lower than 0.91 g/cm³ and an intrinsic viscosity [η] of 0.5–6 dl/g, and a polymerization step (d): wherein ethylene is polymerized or ethylene and other α-olefin are copolymerized using an olefin polymerization catalyst [III] composed of a titanium catalyst component [C] prepared from a titanium compound represented by the formula Ti(OR)$_g$X$_{4-g}$ (wherein R is a hydrocarbon group, X is halogen, and $0 \leq g \leq 4$) and containing titanium, magnesium and halogen as its essential ingredients, an organoaluminum compound [D] and/or an organoaluminum oxy-compound [E] to form an ethylene copolymer [IV] having a density higher than that of the ethylene copolymer [III] and an intrinsic viscosity [η] of 0.5-6 dl/g, wherein the polymerization steps (c) and (d) are carried out in such an order that the step (d) is carried out in the presence of the ethylene copolymer [III] obtained in the step (c) carried out previously, or the step (c) is carried out in the presence of the ethylene polymer [IV] obtained in the step (d) carried out previously so that the ethylene polymer [IV] amounts to 10-1000 parts by weight based on 100 parts by weight of the ethylene copolymer [III].

2. The method for the preparation of an ethylene polymer composition claimed in claim 1, wherein the transition metal of the transition metal compound [A] is zirconium, titanium, hafnium, chromium or vanadium.

3. The method for the preparation of an ethylene polymer composition claimed in claim 2, wherein the polymerization steps (c) and (d) are carried out in such an order that the step (d) is carried out in the presence of the ethylene polymer [III] obtained in the step (c) carried out previously.

4. A method for the preparation of an ethylene polymer composition claimed in claim 2, wherein the amount of the ethylene copolymer [IV] in the polymerization step (d) is 20-500 parts by weight when the amount of the ethylene polymer [III] obtained in the polymerization step (c) is taken as 100 parts by weight.

* * * * *